United States Patent [19]
Letourneau

[11] Patent Number: 5,772,223
[45] Date of Patent: Jun. 30, 1998

[54] SELECTIVELY ATTACHABLE WHEEL ASSEMBLY FOR A CHAIR

[76] Inventor: Ellen A. Letourneau, 261 Maple Hill Ave., Newington, Conn. 06111

[21] Appl. No.: 665,717

[22] Filed: Jun. 18, 1996

[51] Int. Cl.$^6$ ..................................................... B62B 1/04
[52] U.S. Cl. ................................ 280/47.131; 280/47.25; 280/30; 297/354.13; 301/111
[58] Field of Search ........................... 301/1, 111; 297/5, 297/354.13, DIG. 4; 24/510, 511; 280/30, 47.131, 47.24, 13, 7.12; 180/906

[56] References Cited

U.S. PATENT DOCUMENTS

| | | | |
|---|---|---|---|
| 1,472,880 | 11/1923 | Mahr | 280/13 |
| 1,707,186 | 3/1929 | Chatfield | 180/906 |
| 2,352,966 | 7/1944 | Morando | 280/13 |
| 3,782,491 | 1/1974 | Herbenar | 180/906 |
| 4,934,719 | 6/1990 | Dupont | 297/DIG. 4 X |
| 5,161,811 | 11/1992 | Cheng | 280/30 |
| 5,364,112 | 11/1994 | Jackson | 280/47.131 |
| 5,484,154 | 1/1996 | Ward | 280/47.24 |
| 5,492,347 | 2/1996 | Palmeri et al. | 280/47.131 |
| 5,536,027 | 7/1996 | Gollub | 280/7.12 |

*Primary Examiner*—David M. Mitchell
*Attorney, Agent, or Firm*—Alix, Yale & Ristas, LLP

[57] ABSTRACT

The design shows an axle bar or supporting shaft upon which wheels are mounted. The support bar has a clamping mechanism attached to it next to the wheels. The clamps can tightly grab ahold of the legs of a chair. The chair is then tilted backwards and rolled on its attached rear wheels. It is intended that personal belongings may be placed on the chair to facilitate its use as a cart. The wheel apparatus can quickly and easily be removed from the chair by unclamping it. The chair can be utilized for sitting with or without the wheels affixed.

1 Claim, 1 Drawing Sheet

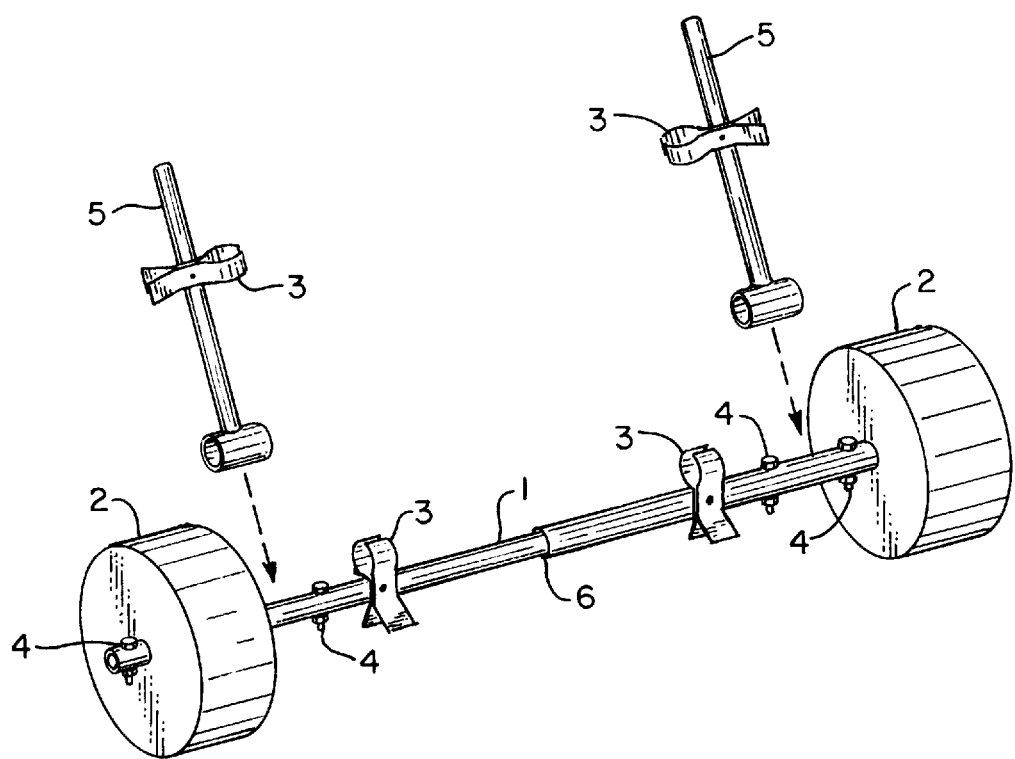

SELECTIVELY ATTACHABLE WHEEL ASSEMBLY FOR A CHAIR

BACKGROUND OF THE INVENTION

A selectively attachable wheel assembly for a chair in accordance with the invention creates an original and conventional cart for adults to sit on after they unload their gear and which folds up for compact storage in the trunk of a car as does the Easy Wheel. The selectively attachable wheel assembly for a chair of the invention transforms an adults portable lawn chair into the conventional cart and then back into a chair again.

BRIEF SUMMARY OF THE INVENTION

An attachable wheel assembly in accordance with the invention attaches wheels with a support bar to the back legs of a chair. By tipping the chair backwards, the chair can be used in a new and useful process as a cart to conveniently carry items to and from outdoor destinations.

A mechanical device for manufacture consisting of a support bar fastened with wheels which clamp onto the back legs of a folding, portable lawn chair so that the chair may then be used in a new and useful process as a cart to carry things like a small cooler to and from the beach.

A chair, such as an aluminum light weight lawn chair, fitted with the attachable wheel assembly can be folded up and lifted easily for storage and transport in a car trunk. The attachable wheel assembly is detachable from the chair so that the chair can be used in the position it was intended by its manufacturer, to sit on, and for easy storage manipulation for transportation. The chair can still be folded up for compact storage and unfolded to function as a usable chair while the attachable wheel assembly is still attached.

BRIEF DESCRIPTION OF THE DRAWING

FIG. 1 shows a full frontal view of the Easy Wheel apparatus as it would clamp onto the rear horizontal leg bar of a folding lawn chair's frame.

DETAILED DESCRIPTION OF THE DRAWING

The Easy Wheel apparatus includes a horizontal support bar 1 which the two wheels 2 and two torque spring clamps 3 (or any strong clamping device) are mounted. Other kinds of clamps, clips, brackets or holding devices may be substituted for the spring torque clamps used for grabbing a hold of the folding chair's legs, as long as their strength and clip size are sufficient to withstand the heavy loads carried on the chair. Additional clamps and wheels may be added to enhance strength and durability of the attachable wheel assembly. The clamps that are attached to the horizontal support bar are in stationary positions, but the clamp locations along that bar may vary and the clamps can be positioned at any position on the support bar. The wheels are held in place on the support bar by wheel bolts 4 each side of the wheel. The wheels can be made of varying materials, sizes and widths, but the attachable wheel assembly preferably has tires having deep treads for use on sandy ground, like at the beach. The support bar is a sliding bar rail 6 near its middle section which allows adjustment of the bar's length. The horizontal support bar can have optional extra arms which slide onto the bar next to the wheels to create an L-positioned bracket alongside the chairs legs and braced with clamps both vertical and horizontal to provide greater stability of the wheels. The horizontal support bar has an adjustable length at it's middle section by sliding the outer pole over the inner, smaller-diameter pole. This bar slides apart into two bars when sliding outwards horizontally. The verticle arms 5 are optional which can slide on the off the support bar. The two verticle arms are also held in place by wheel bolts which can be removed by unscrewing them. The verticle arms are also mounted with a strong clamping device like a torque spring clamp.

Wheels that are attached to a support bar and fastened with clamps which can grip the back legs of a folding lawn chair so that the chair may then be tilted backwards and used as a portable cart to haul gear around outdoors.

I claim:

1. An attachable wheel assembly for a lawn chair having a horizontal rail comprising:

an adjustable elongated support bar having an outer pole slidably engaging an inner pole, said support bar having a first end portion and an opposite second end portion;

a wheel rotatably mounted to each said first and second end portions;

clamp means mounted to said support bar for clamping to a horizontal chair rail oriented generally parallel to said support bar, said clamp means comprising a plurality of spring clamps; and a plurality of mutually parallel arms selectively detachably mounted generally orthogonally to said support bar, and second clamp means mounted to each said arm for clamping to a chair leg, said second clamp means comprising a spring clamp.

* * * * *